(12) United States Patent
Bertolotti et al.

(10) Patent No.: US 7,976,213 B2
(45) Date of Patent: Jul. 12, 2011

(54) ARRANGEMENT FOR CONTROLLING FLUID JETS INJECTED INTO A FLUID STREAM

(75) Inventors: Fabio P. Bertolotti, South Windsor, CT (US); David S. Liscinsky, Glastonbury, CT (US); Vincent C. Nardone, South Windsor, CT (US); Michael K. Sahm, Avon, CT (US); Bernd R. Noack, Berlin (DE); Daniel R. Sabatino, East Hampton, CT (US)

(73) Assignee: United Technologies Corporation, Hartford, CT (US)

( * ) Notice: Subject to any disclaimer, the term of this patent is extended or adjusted under 35 U.S.C. 154(b) by 356 days.

(21) Appl. No.: 12/143,037

(22) Filed: Jun. 20, 2008

(65) Prior Publication Data

US 2008/0251128 A1 Oct. 16, 2008

Related U.S. Application Data

(62) Division of application No. 11/131,976, filed on May 18, 2005, now Pat. No. 7,415,827.

(51) Int. Cl.
*B01F 5/06* (2006.01)
(52) U.S. Cl. ........................................ 366/340; 366/336
(58) Field of Classification Search .................. 366/336, 366/340
See application file for complete search history.

(56) References Cited

U.S. PATENT DOCUMENTS

| 3,938,323 A | * | 2/1976 | Quigg et al. | 60/748 |
| 6,267,552 B1 | * | 7/2001 | Weigand | 415/115 |
| 6,484,505 B1 | * | 11/2002 | Brown et al. | 60/760 |

FOREIGN PATENT DOCUMENTS

| EP | 0959228 | 11/1999 |
| EP | 1130321 | 9/2001 |

OTHER PUBLICATIONS

Article entitled "Optimum Mixing for a Two-Sided Injection from Opposing Rows of Staggered Jets into a Confined Crossflow" by Malte M. Blomeyer, Bernd H. Krautkremer, Dietmar K. Hennecke from The America Society of Mechanical Engineers, Copyright 1996 by ASME 96-GT-453 (pp. 1-6__.

(Continued)

*Primary Examiner* — Walter Griffin
*Assistant Examiner* — Christopher K VanDeusen
(74) *Attorney, Agent, or Firm* — Marjama Muldoon Blasiak & Sullivan LLP

(57) ABSTRACT

In an air mixing arrangement wherein a primary fluid is introduced through an opening in a wall to be mixed with a secondary fluid flowing along the wall surface, the opening is airfoil shaped with its leading edge being orientated at an attack angle with respect to the secondary fluid flow stream to enhance penetration and dispersion of the primary fluid stream into the secondary fluid stream. The airfoil shaped opening is selectively positioned such that its angle of attack provides the desired lift to optimize the mixing of the two streams for the particular application. Embodiments of the arrangement can comprise a collar around the openings, multiple openings that comprise a larger opening and a smaller opening positioned downstream, pairs of openings and associated collars symmetric relationship, and nozzles on the inner side of the wall.

15 Claims, 3 Drawing Sheets

OTHER PUBLICATIONS

Article entitled "Vortex Induction and Mass Entrainment in a Small-Aspect-Ratio Elliptic Jet" by Chih-Ming Ho and Ephraim Gutmark, J. Fluid Mech (1987) col. 179, pp. 383-405.

Article entitled "Flow Control with Noncircular Jets" by E.J. Gutmark, F.F. Grinstein, Ann. Rev. Fluid Mech, 1999, pp. 239-272.

XP-002404952—Database Compendex (Online) Engineering Information, Inc. New York, NY, Kroll J. T. et al. "Optimization of Orifice Geometry for Crossflow Mixing in a Cylindrical Duct" (pp. 1-26).

XP-000937219—Schiel R. et al., "Gas Turbine Heat Transfer: Past and Future Challenges", Journal of Propulsion and Power, Americal Institute of Aeronautics and Astronautics, New York, US, pp. 583-589.

* cited by examiner

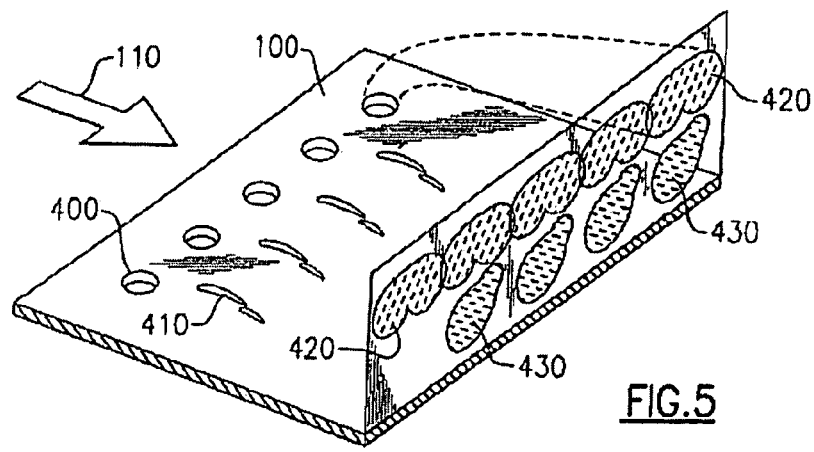
FIG.5
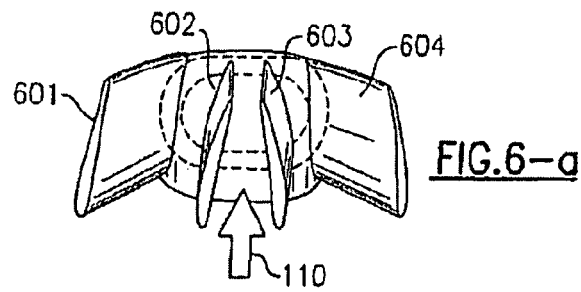
FIG.6-a
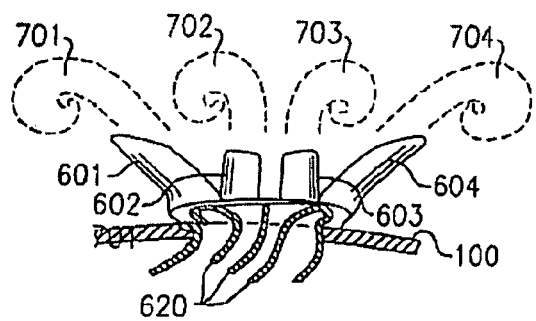
FIG.6-b
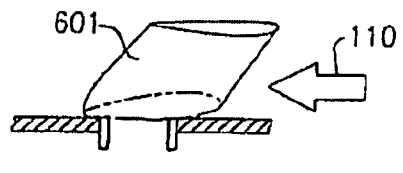
FIG.6-c

ARRANGEMENT FOR CONTROLLING FLUID JETS INJECTED INTO A FLUID STREAM

CROSS REFERENCE TO RELATED APPLICATION

This is a divisional application of U.S. Ser. No. 11/131,976, filed May 18, 2005, now allowed, the entirety of which is incorporated herein by reference.

BACKGROUND OF THE INVENTION

The invention relates generally to the mixing of fluid flow streams and, more particularly to the injection of a primary fluid into a secondary fluid cross-stream, as found in, but not limited to, jet engine combustion chambers, jet engine bleed-air discharge nozzles, and jet-engine thrust vectoring nozzles.

A fluid jet injected essentially normally to a fluid cross-stream is an important phenomenon that is ubiquitous in industrial processes involving mixing and dispersion of one fluid stream into another. For example, the "jet in cross-flow" phenomenon, as it is commonly called, dictates the efficiency of the mixing process between different gases in a jet combustor, controlling the rates of chemical reactions, $NO_x$ and soot formation, and unwanted temperature non-uniformity of gases impinging on the turbine blades.

The jet-in-cross-flow phenomenon is also present at the discharge port of high temperature compressor bleed-air into the fan steam of jet engines, as well as in fuel injector nozzles on afterburners and in fluidic thrust-vectoring devices.

Herein, we define as "primary fluid" the fluid of the injected jet, and as "secondary fluid" the fluid of the cross-stream. The two main characteristics of the jet-in-cross-flow phenomenon are:
  a) the penetration depth of the primary fluid plume into the secondary fluid stream, and
  b) the rate of dispersion and mixing of the primary fluid plume into the secondary fluid stream.

Comprehensive parametric studies of multiple round jets to optimize crossflow mixing performance have been reported since the early '70s, the most general and applicable to subsonic crossflow mixing in a confined duct being reported by J. D. Holdeman at NASA (Holdeman, J. D., "Mixing of Multiple Jets with a Confined Subsonic Crossflow", Prog. Energy Combust. Sci., Vol. 19, pp. 31-70, 1993). Those studies, both numerical and experimental, developed correlating expression to optimize gas turbine combustor pattern factor. The primary result was that the jet-to-mainstream momentum-flux ratio was the most significant flow variable and that mixing was similar, independent of orifice diameter, when the orifice spacing and the square-root of the momentum-flux were inversely proportional. More recent efforts at Darmstadt (Doerr, Th., Blomeyer, M. M., and Hennecke, D. K., "Optimization of Multiple Jets Mixing with a Confined Crossflow", ASME-96-GT-453, 1996 and Blomeyer, M. M., Krautkremer, B. H., Hennecke, D. K., "Optimization of Mixing for Two-sided Injection from Opposed Rows of Staggered Jets into a Confined Crossflow", ASME-96-GT-453, 1996.) further studied the optimization of round jet configurations for gas turbine applications.

Although optimized round jets provide control of pattern factor, reduction of $NO_x$ emissions could be attained by more rapid mixing in the combustion chamber. Since axisymmetric coflow configurations on non-circular orifices, such as an ellipse, had been shown to increase entrainment relative to a circular jet (Ho, C-M and Gutmark, E, "Vortex Induction and Mass Entrainment in a Small-Aspect-Ration Elliptic Jet", J. Fluid Mech., Vol. 179, pp. 383-405, 1987 and Gutmark, E. J. and Grinstein, F. F., "Flow Control with Noncircular Jets", Annual Rev Fluid Mech., Vol. 11, pp. 239-272, 1999), similar orifices were considered for $NO_x$ reduction in crossflow configurations during NASA's High Speed Research program in the early '90s. Liscinsky (Liscinsky, D. S., True, B., and Holdeman, J. D., "Mixing Characteristics of Directly Opposed Rows of Jets Injected Normal to a Crossflow in a Rectangular Duct", AIAA-94-0218, 1994.) and Bain (Bain, D. B., Smith, C. E., and Holdeman, J. D., "CFD Assessment of Orifice Aspect Ratio and Mass Flow Ration on Jet Mixing in Rectangular Ducts", AIAA-94-0218, 1994.) using parallel-sided orifices (squares, rectangles and round-ended slots) launched an investigation to improve upon the mixing performance of round jets. Optimizing correlations were developed but a significant enhancement in mixing relative to round holes was not achieved. The slots were also rotated relative to the mainstream to control jet trajectory but mixing enhancement was not observed for optimized configurations. Concurrent investigations in cylindrical ducts were performed experimentally and numerically by Sowa (Sowa, W. A., Kroll, J. T., and Samuelsen, G. S., "Optimization of Orifice Geometry for Crossflow Mixing in a Cylindrical Duct", AIAA-94-0219, 1994.) and numerically by Oeschle (Oeschle, V. L., Mongia, H. C., and Holdeman, J. D., "An Analytical Study of Jet Mixing in a Cylindrical Duct", AIAa-93-2043, 1993.) also without significant mixing improvement relative to circular jets.

Detailed single jet studies of symmetric noncircular orifice shapes in crossflow were also performed in the late 90s (Liscinsky, D. S., True, B., and Holdeman, J. D., "Crossflow Mixing of Noncircular Jets", Journal of Propulsion and Power, Vol. 12, No. 2, pp. 225-230, 1996 and Zamn, KBMQ, "Effect of Delta Tabs on Mixing and Axis Switching in Jets from Axisymmetric Nozzles", AIAA-94-0186, 1994). These investigations also included the use of tabs placed at the nozzle exit as vortex generators. Azimuthal non-uniformity at the jet inlet is naturally unstable and introduces streamwise vorticity which increases entrainment for axisymmetric flows, however in a crossflow configuration the vorticity field is dominated by the bending imposed by the mainstream. The vorticity generated by the initial jet condition was found to be insignificant and appreciable mixing enhancement relative to a circular jet was not observed.

In summary, a round orifice is the most commonly used shape from which the primary fluid emanates, leading to a jet of essentially cylindrical shape in the vicinity of the orifice. This cylindrical shape is rapidly bent by the secondary cross-stream into a plume oriented with the cross-stream direction. Prior-art investigations have been directed at discovering improved orifice shapes in the hope of passively improving either or both of the plum penetration and dispersion and mixing. While slanted slots have provided some reduction in penetration depth, no shapes have been reported that offer significant improvements over the round orifice shape. The lack of a mechanism for the control of plume penetration depth that is independent of the exit jet velocity is a shortcoming that forces compromises into the design of industrial systems.

Furthermore, the downstream development of the plume from prior-art non-circular orifices is similar to that of the plume form the circular orifice. In particular, both circular and non-circular cases generated a plume characterized by a cross-sectional area of kidney-like form containing two counter-rotating vortices oriented parallel to the secondary-fluid stream direction. Far from the plume, the velocity induced by one vortex of this vortex pair is essentially cancelled by the other counter-rotating vortex of the pair. Consequently, when multiple plumes are present, the counter-rotating vortices produce a weak interaction between neighboring plumes emitted from near-by orifices, leading to relatively weak overall dispersion of the primary fluid.

It is thus desirable to have an orifice shape that leads to a strong control of primary-fluid plume penetration independent of exit jet velocity, thus allowing authoritative placement of the jet plume at a desired, predetermined depth into the secondary steam. It is also desirable to have an orifice shape leading to a plume containing a single, rather than a pair, of vortices, that allows stronger interaction between neighboring plumes.

Objects of the current invention are thus to:

1) provide a geometry for the primary-fluid orifice that leads to a strong control authority over the primary fluid plume penetration depth into the secondary stream, the penetration control being independent of exit jet velocity, and 2) provide a geometry for the primary-fluid orifice that leads to a primary fluid plume having a single dominant component of streamwise vorticity, leading to stronger plume-plume interaction and mixing.

SUMMARY OF THE INVENTION

The orifice from which the primary fluid is emitted is given a streamlined, airfoil-like shape to create (in an extruding fashion) a steamlined jet having a wing-like form in the vicinity of the orifice. The term "streamlined" refers to a body dominated by frictional drag, as opposed to pressure drag. When the wing-like jet is placed at an angle of attack in the secondary fluid cross-stream, a strong tilting force develops on the jet, much like the well known lifting force on a solid wing, causing the jet to bend away from the plane defined by the initial injection direction and the cross-stream direction. By varying the angle of attack, the magnitude of the lifting force is altered, and the penetration of the jet is strongly affected. Additionally, the lift force creates circulatory-flow (i.e. single-sided vorticity) around the jet that maintains itself far downstream of the jet orifice. Both of these effects strongly affect the penetration, mixing, and interaction of multiple fluid-wings. For a given airfoil-like orifice shape, the variation of angle of attack provides a strong control authority over the jet penetration depth. Since the angle of attack is a geometric quantity, it is independent of the exit velocity of the jet, and, thus, provides a control of jet penetration that is independent of jet exit velocity.

BRIEF DESCRIPTION OF THE DRAWINGS

FIG. 5 is a schematic perspective illustration of another embodiment of the present invention, namely both circular and wing-like orifices.

FIGS. 6a-6c are schematic perspective illustrations of yet another embodiment of the present invention, namely a bleed-port attachment with:

FIG. 6a being a top view,

FIG. 6b being the front view looking along the secondary fluid stream direction and FIG. 6c being a side view.

DESCRIPTION OF THE PREFERRED EMBODIMENT

Figure 1:
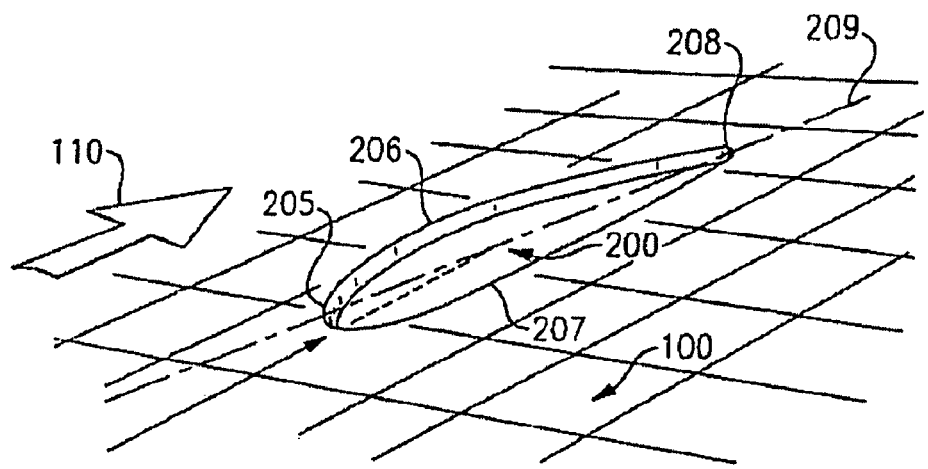
FIG. 1 is a schematic perspective illustration of one possible embodiment of the present invention, namely a wing-like orifice geometry.
Figure 2:
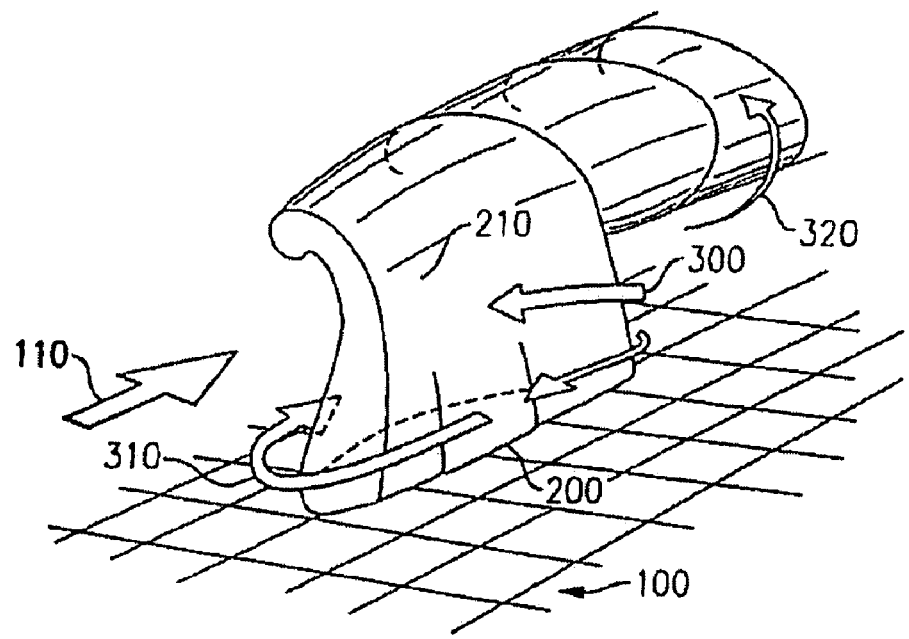
FIG. 2 is a schematic perspective illustration of a wing-like orifice geometry, and its resulting airflow patterns.

In the first embodiment of the invention as shown in FIGS. 1 and 2, a surface 100 separates an upper region containing a secondary fluid moving essentially parallel to said plate from a lower region having a primary fluid at higher pressure than the pressure of the secondary fluid. The surface 100 could be part of any device that mixes cross-streams of fluids, such as combustion chambers, bleed air discharge nozzles and thrust vectoring nozzles of gas turbine engines.

In a jet engine combustion chamber, the primary air is combustion-free air injected into a combustion chamber and is referred to as quench air and the secondary air is air having fully or partially burned fuel and is referred to as front-end air.

In a jet engine bleed air discharge nozzle, the primary air is compressor bleed air and the secondary air is air external to the compressor (e.g. fan-stream air). In a jet engine thrust vectoring nozzle, the primary air is compressed bleed air and the secondary fluid is jet engine exhaust flow.

The direction of the secondary fluid is indicated by arrow 110. The plate has at least one orifice 200 allowing fluid communication between the primary and secondary fluids. The orifice 200 comprises a perforation shaped with an airfoil-like form having a leading edge 205, an upper 206 and a lower edge 207 slowly diverging to a point of maximum separation then slowly converging to a sharp cusp at the trailing edge 208, so as to form an airfoil profile of conventional form. The imaginary line connecting the leading and trailing edge is called the chord, shown at line 209. The orifice is oriented with the leading edge located upstream in the secondary fluid flow from the trailing edge and with the chord aligned with a predetermined angle to the secondary flow direction, the angle being indicated by the symbol a in FIG. 1. The predetermined angle is called the angle of attack, and the combination of angle of attack and orifice shape, including the camber (camber is the curvature of the air foil center-line) of the airfoil, determines the lift force experienced by the primary fluid particles leaving the orifice, and hence determines the plume penetration. Airfoil shapes designed for low Reynolds number flows, as known in the art, are best suited. Given an airfoil shape, the angle of attack is chosen to satisfy the needs of each specific engineering application: low angles of attack when high penetration is desired, high angles of attack (essentially between 0 and 20 degrees) when low penetration is desired.

Due to the pressure difference between the primary fluid and the secondary fluid, a jet of primary fluid 210 is emitted from the orifice 100 into the secondary fluid cross-stream. The jet of primary fluid 210 inherits the airfoil cross-section of the orifice 100 and, consequently, forms a wing-like shape in the vicinity of the orifice 200. The wing-shaped jet experiences a lateral force shown at arrow 300 which is proportional in strength to said angle of attack. The lateral force 300 brings the jet of primary flow substantially perpendicularly away from the plane defined by the direction of the primary fluid jet at the orifice and the direction of the secondary cross-stream, thereby lowering the overall penetration depth of the jet plume into the secondary cross-stream.

In the process of developing lift, a circulatory component of fluid motion, shown at arrows 310 and referred to as "circulation" within conventional airfoil theory, is established at the base of the jet of primary fluid 210. This circulatory motion is convected with the primary fluid particles and remains with the primary fluid particles (Kelvins' theorem), as shown by arrows 320, even after the jet has lost its wing-like shape and has reoriented itself in the cross-stream direction. The circulatory motion of the primary fluid particles establishes a single dominant component of streamwise vorticity in the jet plume (i.e. avoiding the two counter-rotating vortices produced by conventional orifice shapes). Thus, the circulating movement of air, as shown by the arrows 310, is dependent on the airfoil shape of the primary fluid flow 210 and is generally proportional to the angle of attack α. In turn, the force, as shown by the arrow 300, is generally proportional to the circulatory motion 310 and will effect both the penetration depth and the rate of dispersion for the primary fluid flow 210 into the secondary fluid flow 110. Generally, a larger attack angle .alpha. will result in less penetration but greater dispersion. It is thus necessary to choose an appropriate attack angle that will bring about an optimum balance of penetration and dispersion. As a general guideline, it is estimated that an airfoil shaped orifice having an angle of attack of .alpha.=0.degree., provides a 30% greater penetration than a round orifice of the same area. Further if the same airfoil shaped orifice is presented so as to have an angle of attack of .alpha.=10.degree., then the penetration is estimated to be about half (50%) that of a corresponding round orifice, but with much better dispersion characteristics. As further guidance, an attack angle in the range of negative 5 to positive 25 degrees is suggested for a jet engine combustion chamber, and an attack angle of 5 to 15 degrees (as needed to place the plume away from the nacelle surfaces at downstream locations) is suggested for a jet engine bleed air discharge nozzle.

Figure 3:
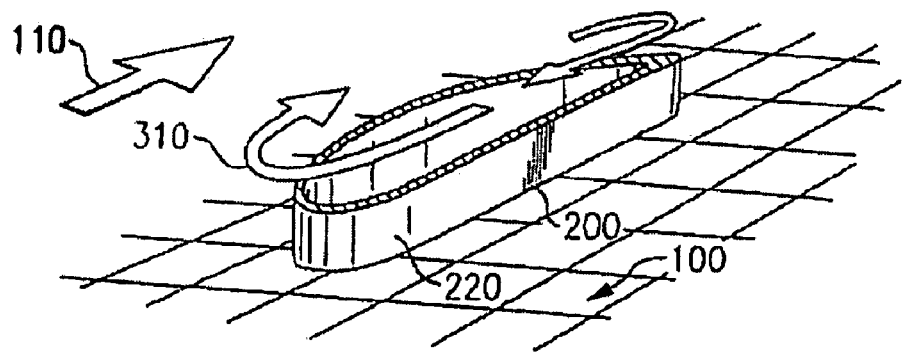
FIG. 3 is a schematic perspective view of the embodiment shown in FIG. 1 with an included solid collar attached to the orifice.

In reference to FIG. 3, a collar, or solid sleeve 220, is added to the perimeter of orifice 200 to "lift" the orifice off the plane 100. Essentially, the collar gives the orifice an extension into the third dimension. The collar is beneficial, for example, in those cases when the flow through the orifice is reduced to a trickle and the trickling fluid must avoid contact with the plane 100. Such a case exists, for example, for the bleed-air port on jet engines, wherein the trickle is caused by an incomplete closure of the bleed-air valve, and the hot trickling air can damage the nacelle when contacting the nacelle surface.

Figure 4:
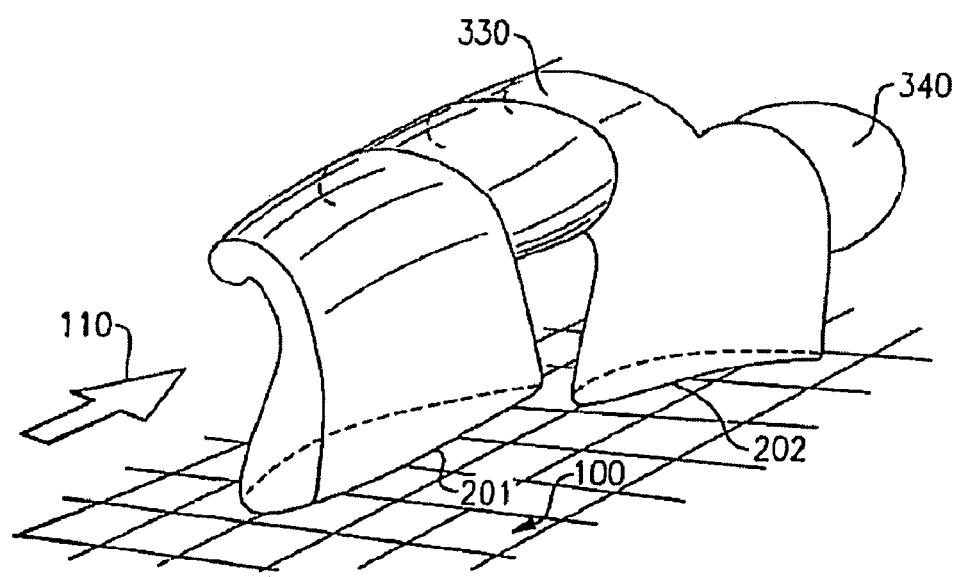
FIG. 4 is a schematic perspective illustration of an alternative embodiment of the present invention, namely a main-wing orifice and an auxiliary flap orifice.

In another embodiment of the invention as shown in FIG. 4, the orifice comprises a first and second opening. The first opening, shown at 201, forms the "main wing" jet and the second opening, shown at 202, forms an auxiliary flap jet whose role is to increase the efficiency and the lift force experienced by the main-wing jet, much like a conventional trailing edge flap aids the performance of the main wing at lower wing translational velocities. Furthermore, the close proximity of the main-wing jet to the flap jet creates a strong interaction between the downstream plume 330 from the main opening and the downstream plume 340 from the flap opening. This interaction leads to increased mixing of primary fluid with the secondary fluid.

Another embodiment of the invention is shown in FIG. 5 which relates to a combustor application, wherein it is desired to provide a substantially increased amount and penetration of primary airflow. For example, where the combustor maybe constrained in length and there isn't sufficient surface to rely on only airfoil shaped orifices, it maybe advantageous to use a combination of orifice shapes as shown.

In the FIG. 5 embodiment, a surface 100 of a combustor liner separates an upper region (i.e. the combustion zone) containing a secondary fluid moving parallel to said plate from a lower region having a primary fluid at higher pressure than the pressure of the secondary fluid. The secondary fluid direction is indicated by arrow 110. The plate has a pattern of orifices for communication between the primary and secondary fluid, the pattern comprising a mixture of wing-like orifices and non-wing-like orifices. Although other shapes could be used, FIG. 5 shows the non-wing-like orifices having a circular shape. A part of this pattern is shown in FIG. 5 wherein circular orifices are shown at 400 and orifices having a wing-like streamlined cross-section are shown at 410. Examples or orifice patterns maybe the alternating rows of circles and wings, as shown in FIG. 5, or maybe a checkerboard pattern of circles and wings (not shown), or other patterns. A jet from circular holes forms a downstream plume of kidney-shaped cross sections, as indicated by 420 that is located away from the pate 100, leaving a volume of secondary fluid below said plume that is not active in the mixing of the primary fluid with the secondary fluid. The juxtaposition of circular orifices with wing-like orifices, each at a predetermined angle of attack, allows a positioning of the downstream plumes from the wing-like orifices 430 below the downstream plumes from the circular orifices 420. This produces mixing between the primary fluid and the secondary fluid over a greater volume of secondary fluid above the plate. As a further benefit, the pressure-drop between primary and secondary fluids is less than the pressure drop associated with an orifice pattern consisting of large and small diameter circular holes, wherein the small-diameter holes are used to generate an overall plume distribution that approximates the distribution generated by the airfoil-shaped orifices.

A further embodiment of the invention is shown in FIGS. 6a, 6b and 6c wherein, in a bleed port attachment application, the authority over plume penetration is used to construct a bleed-port attachment that positions and shapes the exhausted bleed-air plume into a desired form and trajectory. A surface 100 (FIG. 6) separates an upper region (e.g. the fan duct) containing a secondary fluid (namely bypass air) moving parallel to said plate from a lower region (e.g. ducts in communication with the compressor section of the gas turbine engine) having a primary fluid (namely core engine air) at higher pressure than the pressure of the secondary fluid. The attachment comprises at least two wing-shaped orifices with collars, and preferably four orifices with collars oriented with an angle of attack with respect to the secondary fluid stream direction, indicated by arrow 110 in FIG. 6a. The orifices and collars provide communication between the primary and secondary fluids, and the pressure difference between the primary and secondary fluids generates a jet of primary fluid from each orifice, the jet having an airfoil-like cross section and a wing-like form in the vicinity of each orifice. When the primary fluid plume must be spread over a wide space within the secondary fluid stream, at least two orifices with collars are positioned with opposite directed lift directions, such as collars 602 and 603 in FIG. 6, such that the corresponding emitted plumes 702 and 703 spread laterally away from one another as each plume convects in the secondary cross-stream flow. The angle of attack of the orifices plus collars 602 and 603 is increased or decreased to reduce or increase plume penetration into the secondary stream, as desired.

When four orifices with collars are used, the outer two collars 601 and 604 are each oriented to give a lift directed in the same direction as that of the neighboring inner collar, and the outer two collars 601, 604 are preferably titled away from the perpendicular direction to plane 100 to further assist the lateral displacement of associated plumes 701 and 704. When the plumes emitted from the inner orifices 601, 602 penetrate further into the secondary air stream than the plumes from the outer orifices 601, 604, and an essentially equal penetration of plumes from all four orifices is desired, the collars of the inner two orifices 602, 603 are preferably lower in height than the height of the outer collars 601, 604.

When an asymmetric plume development downstream of the bleed port is desired, the lift direction of same, or all, of the orifices and collars maybe oriented toward the desired side of the bleed port (asymmetric bleed-port attachment not shown).

Guide vanes 620 extend from the bleed-port attachment into the piping feeding the bleed-port to partition the primary fluid flow into parts appropriate for each orifice. Furthermore, the guide vanes help prevent undesired unsteadiness in the fluid emitted from each orifice.

In addition to the advantages and benefits of the present invention as discussed hereinabove, the reduction in $No_x$ gas resulting from lowered operating temperatures should be mentioned. In this regard, it should be recognized that, in a jet engine combustion chamber, the secondary fluid contains combustible fuel as it approaches and passes around the plume being introduced by the primary fluid. When this plume is substantially round, as will be the case for round orifices, there will be a substantial wake created on the downstream side of the primary fluid plume. The entrained fuel tends to remain within that wake and its temperature is, accordingly, caused to rise to the point where $No_x$ gases are formed. This is to be contrasted with the rather sharp trailing edge of a primary fluid plume resulting from an airfoil shaped orifice. Here, there is very little, if any, wake created at the trailing edge and therefore the fuel is not trapped in this area, but continues to flow downstream and remain at temperatures that are not likely to cause $No_x$ formation.

While the present invention has been particularly shown and described with reference to the preferred mode as illustrated in the drawing, it will be understood by one skilled in the art that various changes in detail maybe effected therein without departing from the scope of the invention as defined by the claims.

We claim:

1. A method of mixing cross-streams of a primary fluid stream and a secondary fluid stream flowing in a first direction substantially parallel to and over a surface of a wall, said method comprising:
    forming an opening with an airfoil profile in said wall oriented at an angle of attack, $\alpha$, with respect to said first direction; and
    causing said first fluid stream to flow through said opening so as to be mixed with said secondary fluid,
    wherein said airfoil profile has a leading edge and a trailing edge downstream of the leading edge and at which the airfoil profile converges to a sharp cusp,
    wherein said wall is part of a jet engine combustion chamber, and
    wherein said primary fluid stream is quench air and wherein said secondary fluid stream is front-end air.

2. A method as set forth in claim 1 wherein said angle $\alpha$ is in the range of 0-10°.

3. A method as set forth in claim 1 wherein said opening comprises a plurality of openings, each having said airfoil profile.

4. A method as set forth in claim 3 wherein said plurality of openings includes at least one larger opening and one smaller opening disposed downstream, with respect to the secondary fluid flow, of said larger opening.

5. A method as set forth in claim 4 further comprising providing a collar around said openings, wherein said collar is attached to and extends from said wall.

6. A method as set forth in claim 1 further comprising forming at least one round shaped opening in said surface.

7. A method as set forth in claim 6 wherein said round shaped opening is located upstream from said opening that has said airfoil profile.

8. A method as set forth in claim 3 wherein said plurality of openings includes a pair of openings that are symmetrically disposed with respect to said first direction, and wherein said openings in said pair have respective angles of attack that are on opposite sides of said first direction.

9. A method as set forth in claim 8 wherein said plurality of openings includes one or more other pairs of openings, and wherein each pair is symmetrically disposed about said first direction.

10. A method as set forth in claim 8 wherein each of said openings includes a collar that surrounds said opening and extends outwardly from said wall.

11. A method as set forth in claim 8 wherein each of said openings includes a guide vane that is attached to and extends inwardly from said wall.

12. The method as set forth in claim 1 further comprising causing said first fluid stream to flow through said opening in a direction substantially normal to said first direction.

13. The method as set forth in claim 1 wherein said angle of attack, $\alpha$, is in the range of approximately minus 5 to 25 degrees.

14. The method as set forth in claim 1 further comprising selecting the angle of attack, $\alpha$, to provide a desired degree of penetration of the first fluid stream into the second fluid stream.

15. The method as set forth in claim 14 wherein the step of selecting the angle of attack, $\alpha$, to provide a degree of penetration desired comprises:
    selecting a low angle of attack when a high penetration is desired; and
    selecting a high angle of attack when a low penetration is desired.

* * * * *